(12) United States Patent
Lin et al.

(10) Patent No.: US 8,229,510 B2
(45) Date of Patent: Jul. 24, 2012

(54) DEVICE HAVING 2D AND 3D IMAGE DISPLAY FUNCTIONS FOR MOBILE PHONE

(75) Inventors: Ming-Yen Lin, Taipei (TW); Kan-Ju Lee, Taipei County (TW)

(73) Assignee: Unique Instruments Co. Ltd, Taipei (TW)

( * ) Notice: Subject to any disclaimer, the term of this patent is extended or adjusted under 35 U.S.C. 154(b) by 244 days.

(21) Appl. No.: 12/770,196

(22) Filed: Apr. 29, 2010

(65) Prior Publication Data
US 2010/0279739 A1    Nov. 4, 2010

(30) Foreign Application Priority Data
Apr. 29, 2009  (TW) .............................. 98114174 A

(51) Int. Cl.
*H04B 1/38*    (2006.01)
(52) U.S. Cl. ........................................ 455/566; 345/664

(58) Field of Classification Search .................. 455/566, 455/575.3, 575.4; 345/653, 654, 664, 665
See application file for complete search history.

(56) References Cited

U.S. PATENT DOCUMENTS

| 6,831,291 | B2 * | 12/2004 | Imai ............................. 250/591 |
| 7,397,511 | B2 * | 7/2008 | Ezawa .......................... 348/373 |
| 2009/0111511 | A1 * | 4/2009 | Bengtsson ................. 455/556.1 |
| 2010/0081477 | A1 * | 4/2010 | Coll et al. ..................... 455/566 |

FOREIGN PATENT DOCUMENTS
EP    1379063 A1 *    1/2004
* cited by examiner

*Primary Examiner* — Tu X Nguyen
(74) *Attorney, Agent, or Firm* — Morris Manning & Martin LLP; Tim Tingkang Xia, Esq.

(57) ABSTRACT

A device having 2D and 3D image display functions for a mobile phone is provided. A plurality of image pickup elements, a 2D and 3D touch screen, and a 2D and 3D function key are installed on the mobile phone, so as to achieve the function of 3D image capture and viewing as well as 3D interface operations.

12 Claims, 13 Drawing Sheets

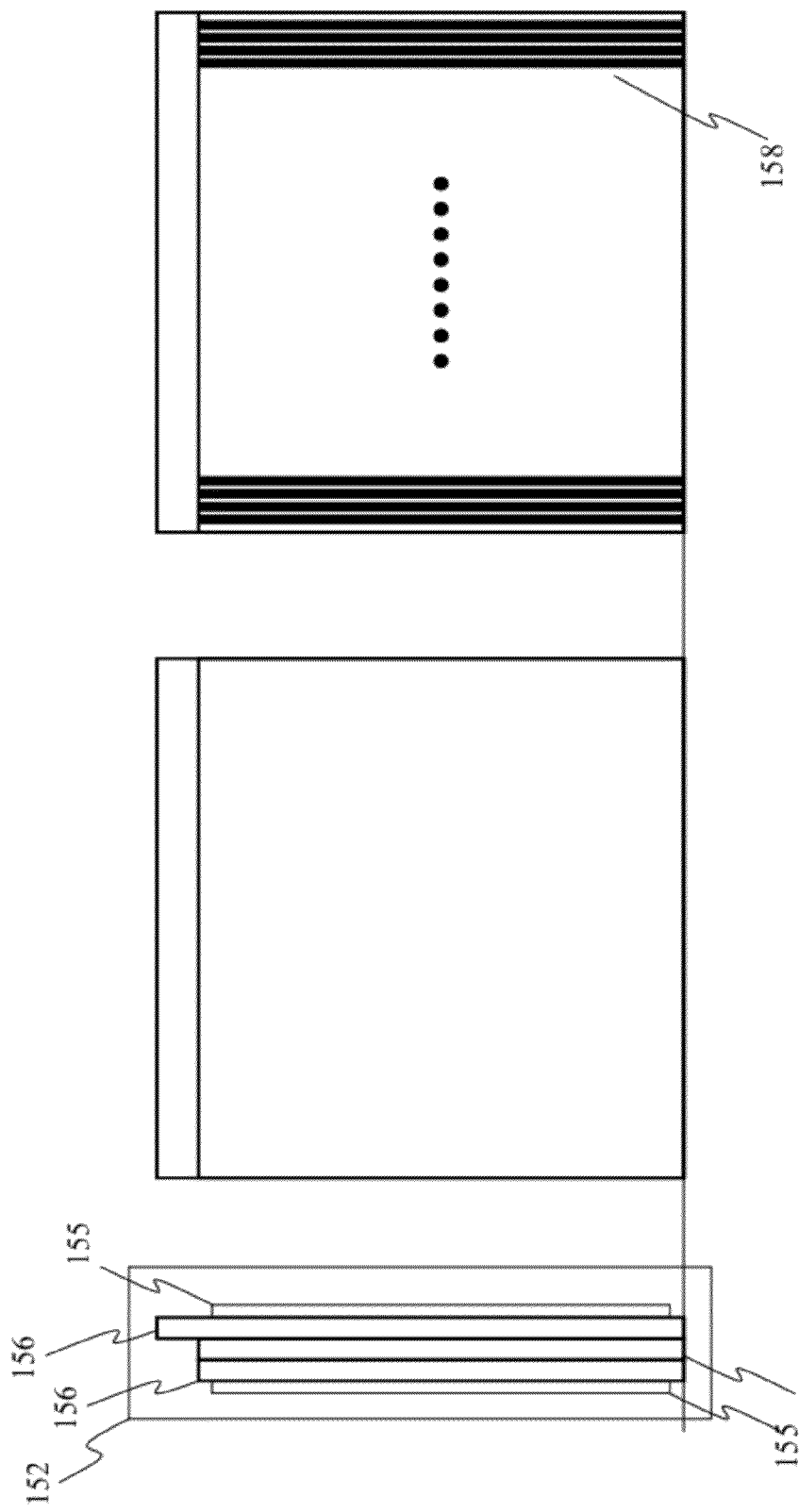

DEVICE HAVING 2D AND 3D IMAGE DISPLAY FUNCTIONS FOR MOBILE PHONE

BACKGROUND OF THE INVENTION

1. Field of Invention

The present invention relates to a device having 2D and 3D image display functions for a mobile phone, in which a plurality of image pickup elements, a 2D and 3D touch screen, and a 2D and 3D function key are installed on the mobile phone, so as to achieve the purposes of 3D image capture and viewing as well as 3D interface operations.

2. Related Art

FIGS. 1-3 are schematic drawings illustrating main structures of three conventional mobile phones. As shown in FIGS. 1-2, the conventional mobile phone 10 or 20 mainly includes an upper cover device 11 or 21, a lower cover device 12 or 22, two image pickup elements 13 and 14 or 23 and 24, a touch screen 15 or 25, and a set of function keys 16 or 26. Elements having other functions required by a general conventional mobile phone will not be described herein. In the conventional mobile phone 10, the upper cover device 11 and the lower cover device 12 are slidably opened or closed through a slide mechanism (not shown). In the conventional mobile phone 20, the upper cover device 21 and the lower cover device 22 are rotatably unfolded or folded through a rotating mechanism (not shown). FIG. 3 shows a conventional mobile phone 30 having a single-unit structure, which includes the same elements except for the upper and lower cover devices as those of the above two conventional mobile phones 10 and 20, that is, includes two image pickup elements (33 and 34), a touch screen 35, and a set of function keys 36. Therefore, the mobile phone 10, 20, or 30 having such structure cannot capture 3D images since the two image pickup elements are not installed on the same face; further, the touch screen is formed by a liquid crystal display (LCD) screen and a touch panel, and certainly cannot display 3D images because the general LCD screen is used. Besides, since the touch screen does not have the efficacy of 3D image display, a 3D image interface also cannot be provided for a user to perform 3D operations. The basic technique for 3D image capture is described in detail in ROC Patent No. 1243595 and ROC Patent Applications No. 098113124 and No. 098113623, and the basic technique for 3D image display is described in detail in ROC Patent Applications No. 097135421 and No. 098113625, and thus will not be described herein. However, the technique for the 3D interface operations is neither disclosed in the above patents nor provided in any product on the market.

SUMMARY OF THE INVENTION

In view of the deficiencies that the conventional mobile phone cannot capture or display 3D images and does not support 3D image interface operations, according to the above conventional 3D-related basic techniques, the present invention is directed to a device having 2D and 3D image display functions for a mobile phone, in which a plurality of image pickup elements, a 2D and 3D touch screen, and a 2D and 3D function key are installed on the mobile phone, thereby achieving the functions of 3D image capture and viewing as well as 3D interface operations in addition to providing the original 2D efficacy relying mainly on 2D images. The efficacy of the present invention is illustrated below through different embodiments.

BRIEF DESCRIPTION OF THE DRAWINGS

The present invention will become more fully understood from the detailed description given herein below for illustration only, and thus are not limitative of the present invention, and wherein:

FIGS. 6-8 are schematic drawings illustrating the structure and efficacy of a 2D and 3D image switchable parallax barrier;

DETAILED DESCRIPTION OF THE INVENTION

First Embodiment

Figure 1:
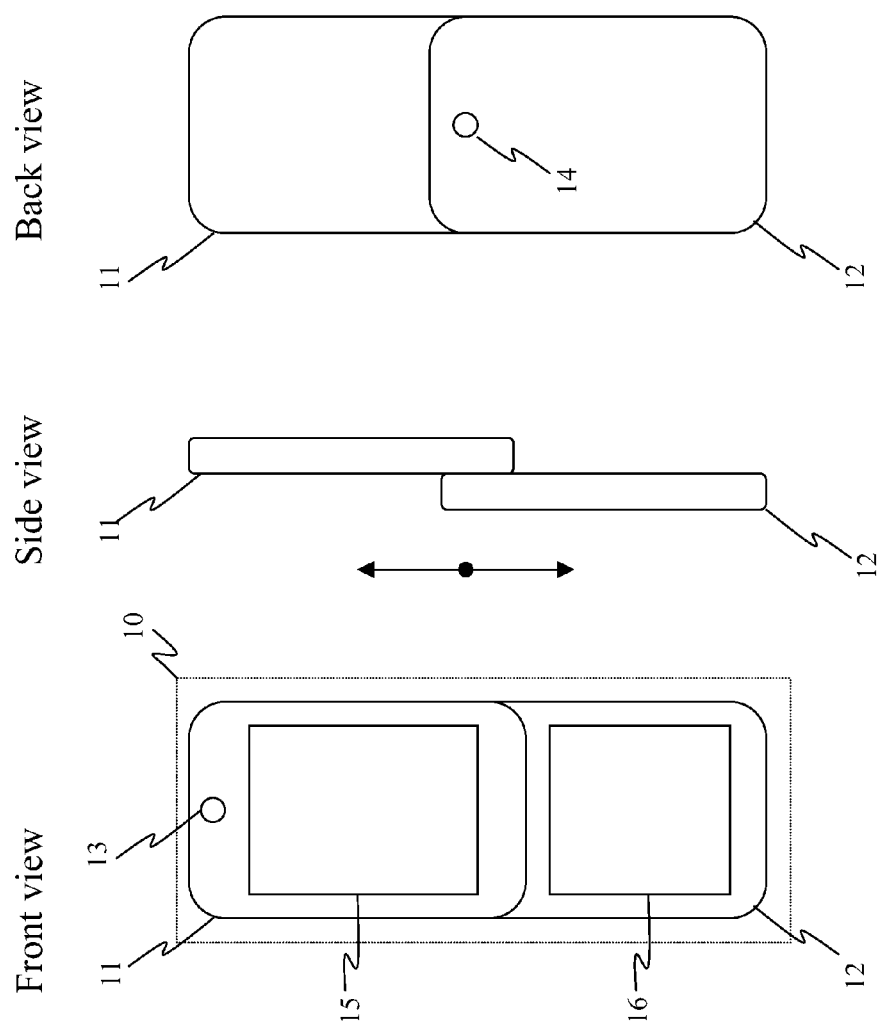
FIGS. 1-3 are schematic drawings illustrating main structures of three conventional mobile phones.
Figure 2:
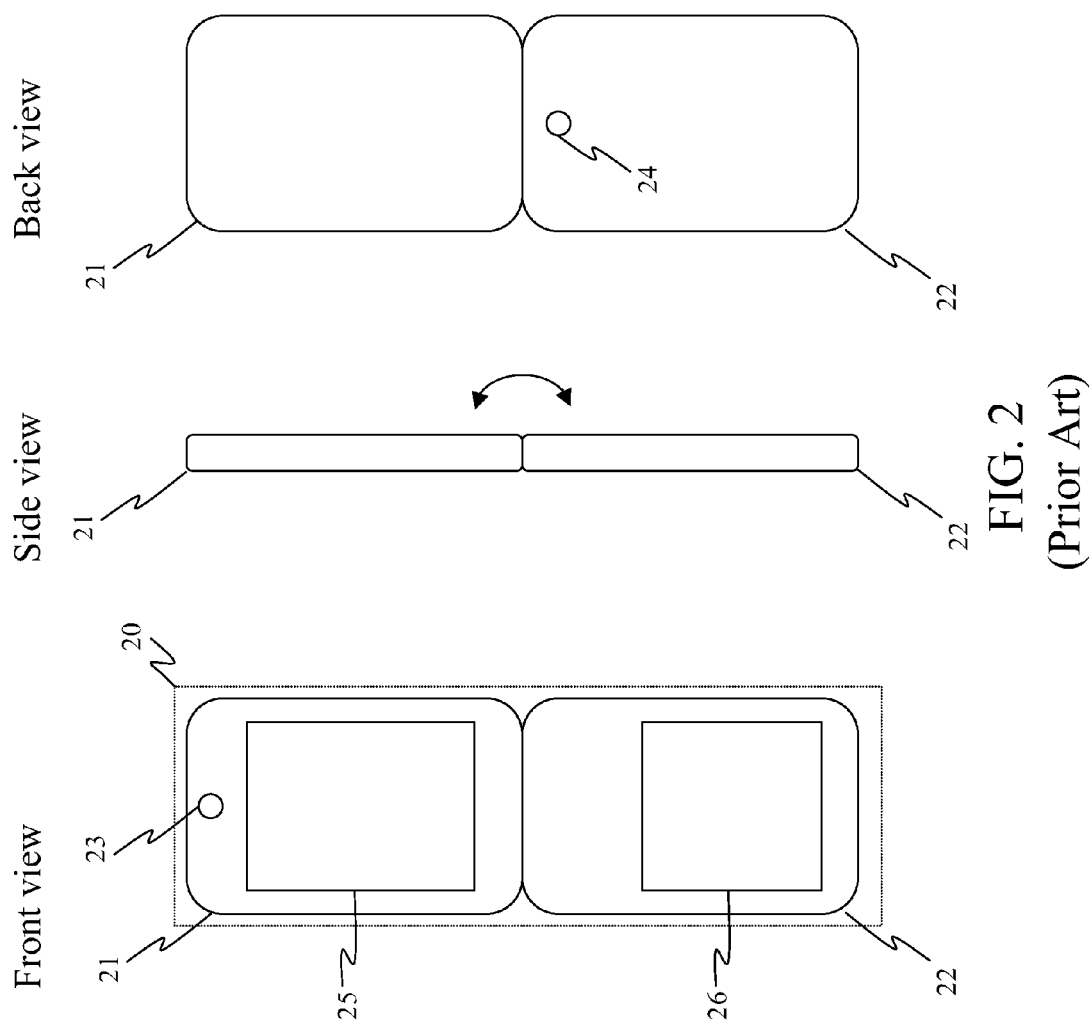
Figure 3:
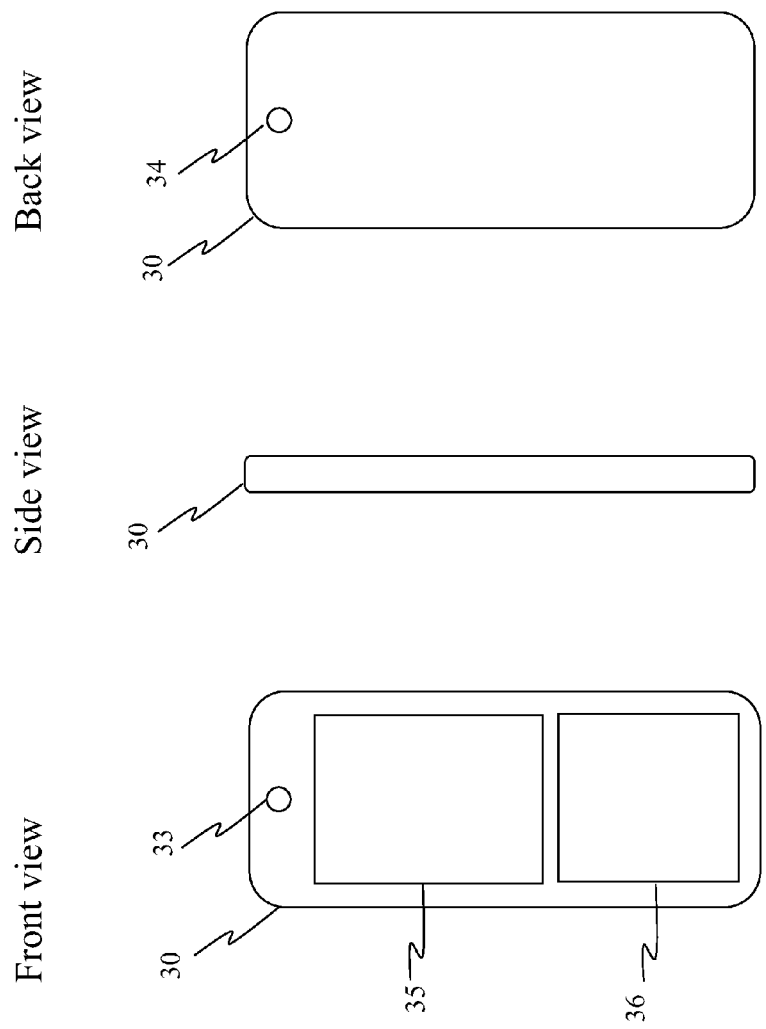
Figure 4:
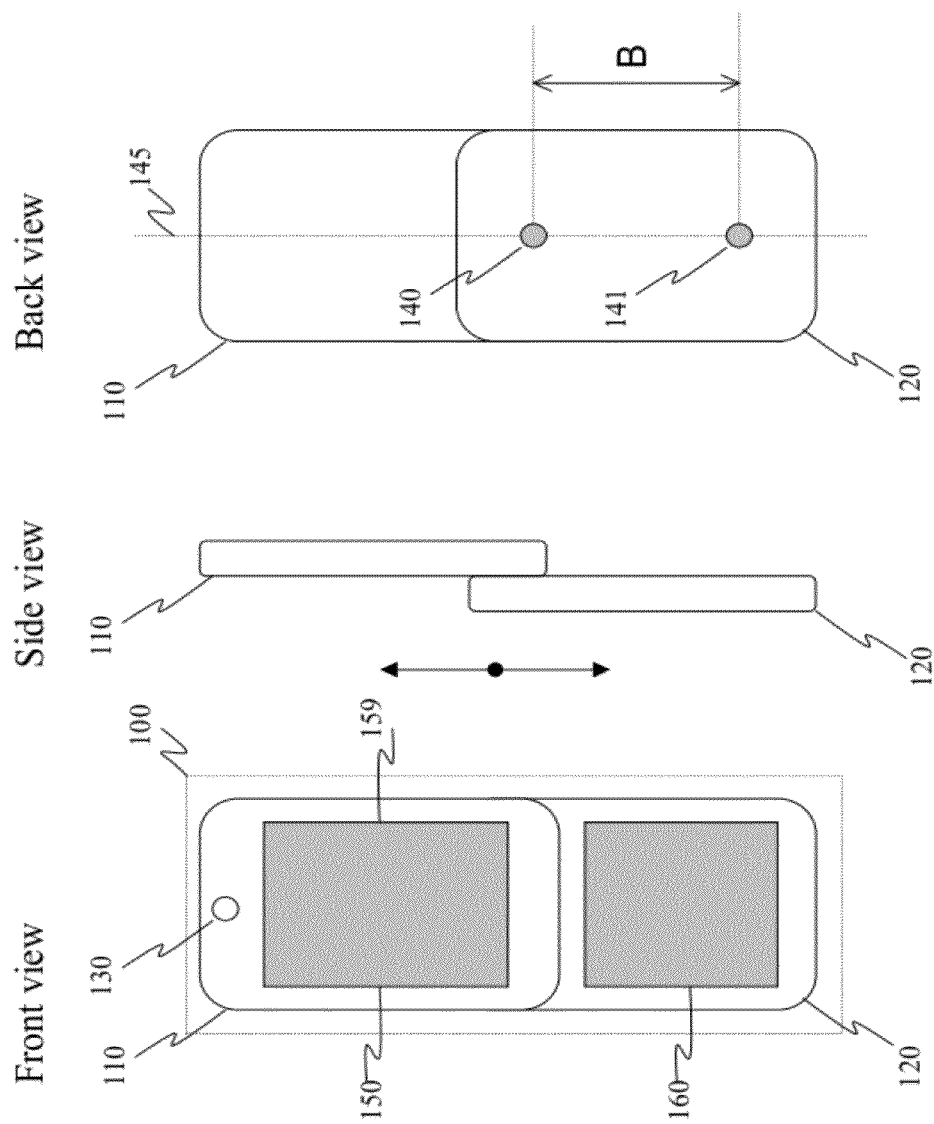
FIG. 4 is a schematic drawing of a first embodiment of the present invention.

FIG. 4 is a schematic drawing of a first embodiment of the present invention. The device 100 having 2D and 3D image display functions for a mobile phone mainly uses the conventional structure, but adds an image pickup element 141 on a back face of a lower cover device 120, adds a 2D and 3D touch screen 150 on a front face of an upper cover device 110, and adds a 2D and 3D function key 160 on a front face of the lower cover device 120.

The image pickup element 141 has the same structure as that of an original image pickup element 140, i.e., is formed by a general conventional lens module. Besides, the image pickup element 141 must be installed at such a position that the image pickup element 141 is at a distance B from the original image pickup element 140 and arranged in a straight line 145 with the original image pickup element 140. A direction of the straight line 145 must be parallel to a side 159 (for example, a long side) of the display screen 150. In this way, the two image pickup elements 140 and 141 can capture a tow-view 3D image. Besides, the synchronous capture control required between the two image pickup elements 140 and 141 is described in detail in ROC Patent No. 1243595 and ROC Patent Applications No. 098113124 and No. 098113623, and thus will not be described herein.

Figure 5:
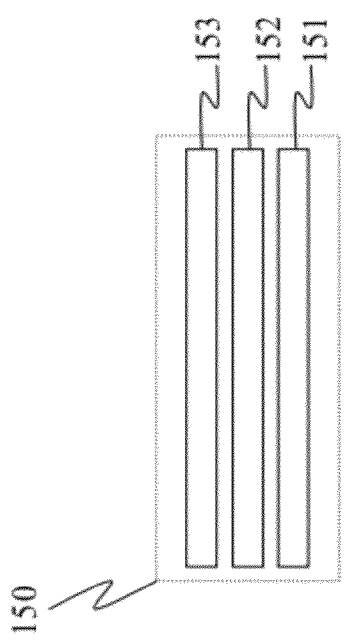
FIG. 5 is a schematic drawing illustrating the structure of a 2D and 3D touch screen.

FIG. 5 is a schematic drawing illustrating a structure of the 2D and 3D touch screen. The 2D and 3D touch screen is mainly formed by a flat screen 151, a 2D and 3D image switchable parallax barrier 152, and a touch panel 153. The flat screen 151 may be a general flat panel display, such as an LCD screen or an organic light emitting diode (OLED) screen. The touch panel 153 is a conventional touch panel for providing input through hand touch operations.

FIGS. 6-8 are schematic drawings illustrating the structure and efficacy of the 2D and 3D image switchable parallax barrier 152. As shown in FIG. 6, the 2D and 3D image switchable parallax barrier 152 mainly includes two polarizers 155, two indium tin oxide (ITO) glasses 156, and a liquid crystal layer 157. Electrodes 158 in the shape of linear stripes shown in FIG. 8 are printed on one of the ITO glasses 156. Therefore, as shown in FIG. 8, when a voltage is applied on the 2D and 3D image switchable parallax barrier 152, the linear stripes 158 are presented, thereby achieving the efficacy of 3D display; while when no voltage is applied, as shown in FIG. 7, a transparent state is presented for 2D use. Besides, the stripes 158 may also be presented reversely in response to the applied voltage according to different settings of polarization directions of the two polarizers 155, that is, the stripes 158 are presented when no voltage is applied, while the transparent state is presented when a voltage is applied. The 2D and 3D image switchable parallax barrier 152 must be installed between the flat screen 151 and the touch panel 153, so as to realize 3D image display and 3D interface operations.

Figure 9:
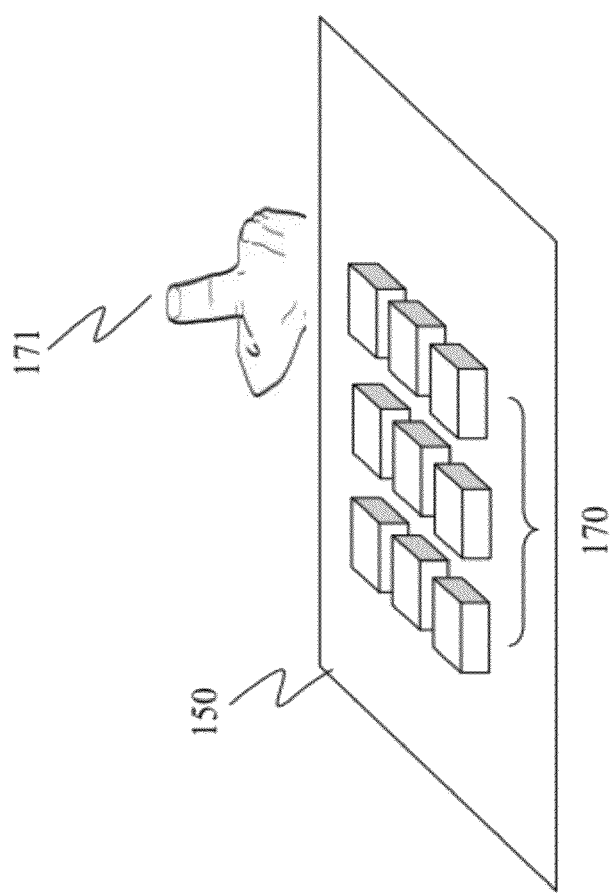
FIG. 9 is a schematic drawing of 3D interface operations.

As shown in FIG. 9, the 3D interface operations are to provide a stereo pattern 170 with a 3D visual effect by the 2D and 3D touch screen 150, i.e., visually display the 3D graphics interface 170 through the flat screen 151 and the 2D and 3D image switchable parallax barrier 152, and to directly touch to operate the touch panel 153 with a finger 171, so as to achieve the efficacy of 3D interface operations.

Figure 10:
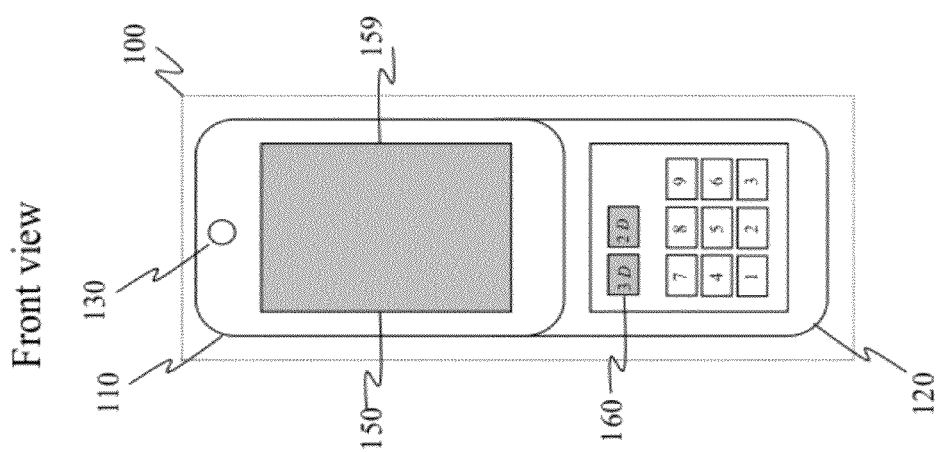
FIG. 10 is a schematic drawing illustrating the configuration of a 2D and 3D function key.

FIG. 10 is a drawing illustrating the configuration of the 2D and 3D function key. The 2D and 3D function key 160 is formed by a 3D key and a 2D key. When the 3D key is pressed, the 2D and 3D image switchable parallax barrier 152 is started to present the stripes 158 and start the functions of 3D image capture and display as well as 3D interface operations. When the 2D key is pressed, the original conventional 2D function is recovered.

Second Embodiment

Figure 11:
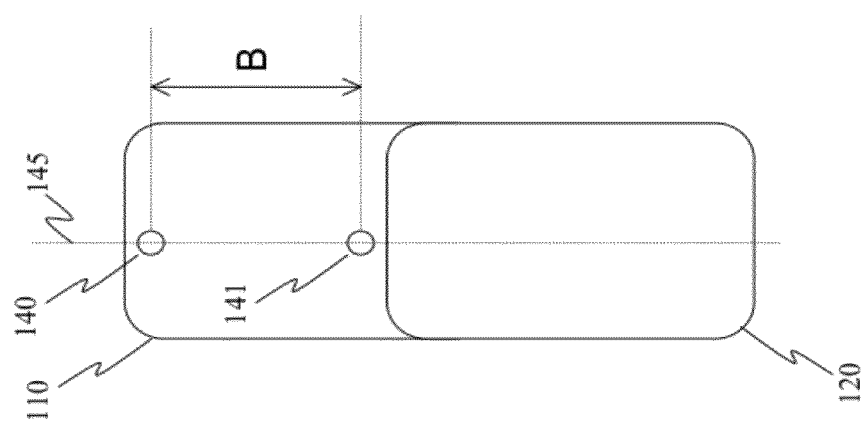
FIG. 11 is a schematic drawing of a second embodiment of the present invention.

FIG. 11 is a schematic drawing of the second embodiment of the present invention. The configuration of the second embodiment of the present invention is substantially the same as that of the first embodiment. The only difference lies in that: the two image pickup elements 140 and 141 are installed at appropriate positions on the back face of the upper cover device 110.

Third Embodiment

Figure 12:
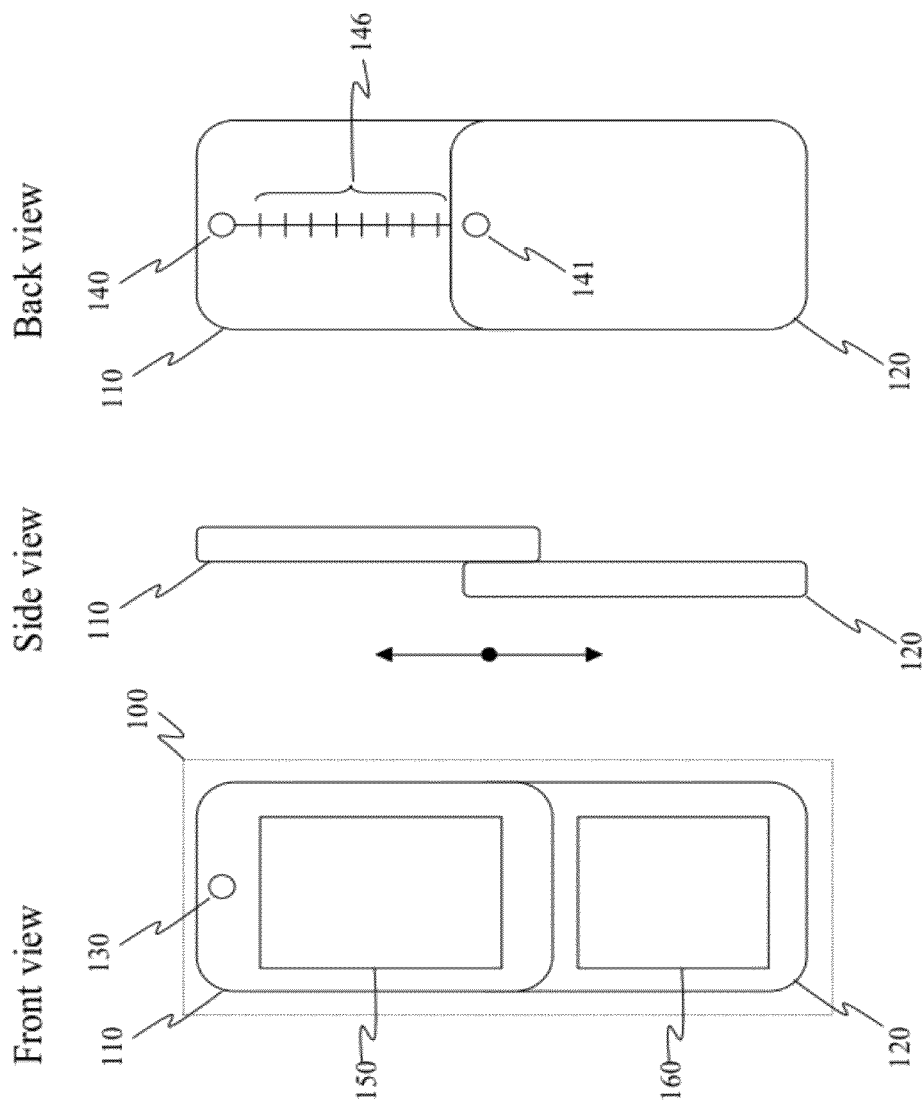
FIG. 12 is a schematic drawing of a third embodiment of the present invention.

FIG. 12 is a schematic drawing of the third embodiment of the present invention. The configuration of the third embodiment of the present invention is substantially the same as that of the first embodiment. The only difference lies in that: the two image pickup elements 140 and 141 are respectively installed at appropriate positions on the back faces of the upper cover device 110 and the lower cover device 120. Therefore, a stereo base between the two image pickup elements 140 and 141 can be changed and adjusted by sliding the upper cover device 110 and the lower cover device 120 relative to each other, so as to achieve the effect of parallax changing. Besides, a scale mark 146 is disposed at an appropriate position of the upper cover device 110, for setting the stereo base between the two image pickup elements 140 and 141. Further, the relevant method for optimal 3D parallax adjustment required for the two image pickup elements 140 and 141 when 3D images are captured is described in detail in ROC Patent No. 1243595 and ROC Patent Application No. 098113124.

Fourth Embodiment

Figure 13:
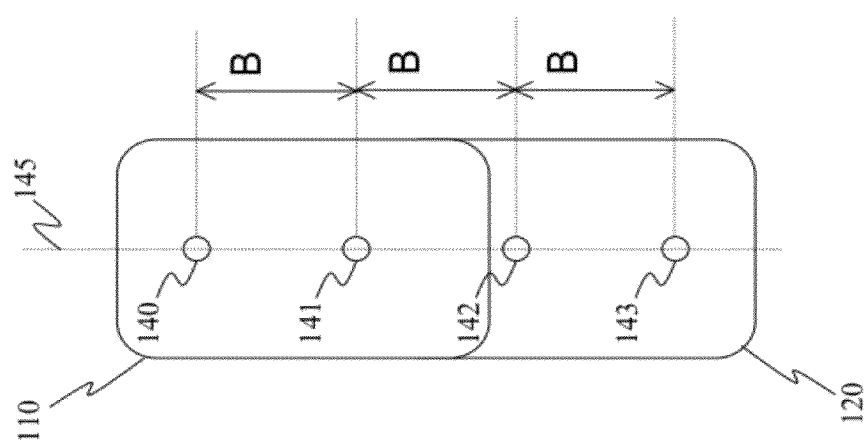
FIG. 13 is a schematic drawing of a fourth embodiment of the present invention.

FIG. 13 is a schematic drawing of the fourth embodiment of the present invention. The configuration of the fourth embodiment of the present invention is substantially the same as that of the first embodiment. The only difference lies in that: a plurality of (for example, four) image pickup elements 140, 141, 142, and 143 is installed at appropriate positions on back faces of the upper cover device 110 and the lower cover device 120. The image pickup elements 140, 141, 142, and 143 are installed at such positions that the image pickup elements 140, 141, 142, and 143 are spaced by an equal distance B and in a straight line 145 when the upper cover device 110 and the lower cover device 120 are completely slid relative to each other. A direction of the straight line 145 must be parallel to a side 159 (for example, a long side) of the display screen 151. In this way, the plurality of image pickup elements 140, 141, 142, and 143 can capture a multi-view (for example, 4-view) 3D image. Besides, the synchronous capture control required by the plurality of image pickup elements 140, 141, 142, and 143 is described in detail in ROC Patent No. I243595 and ROC Patent Applications No. 098113124 and No. 098113623, and thus will not be described herein.

Fifth Embodiment

Figure 14:
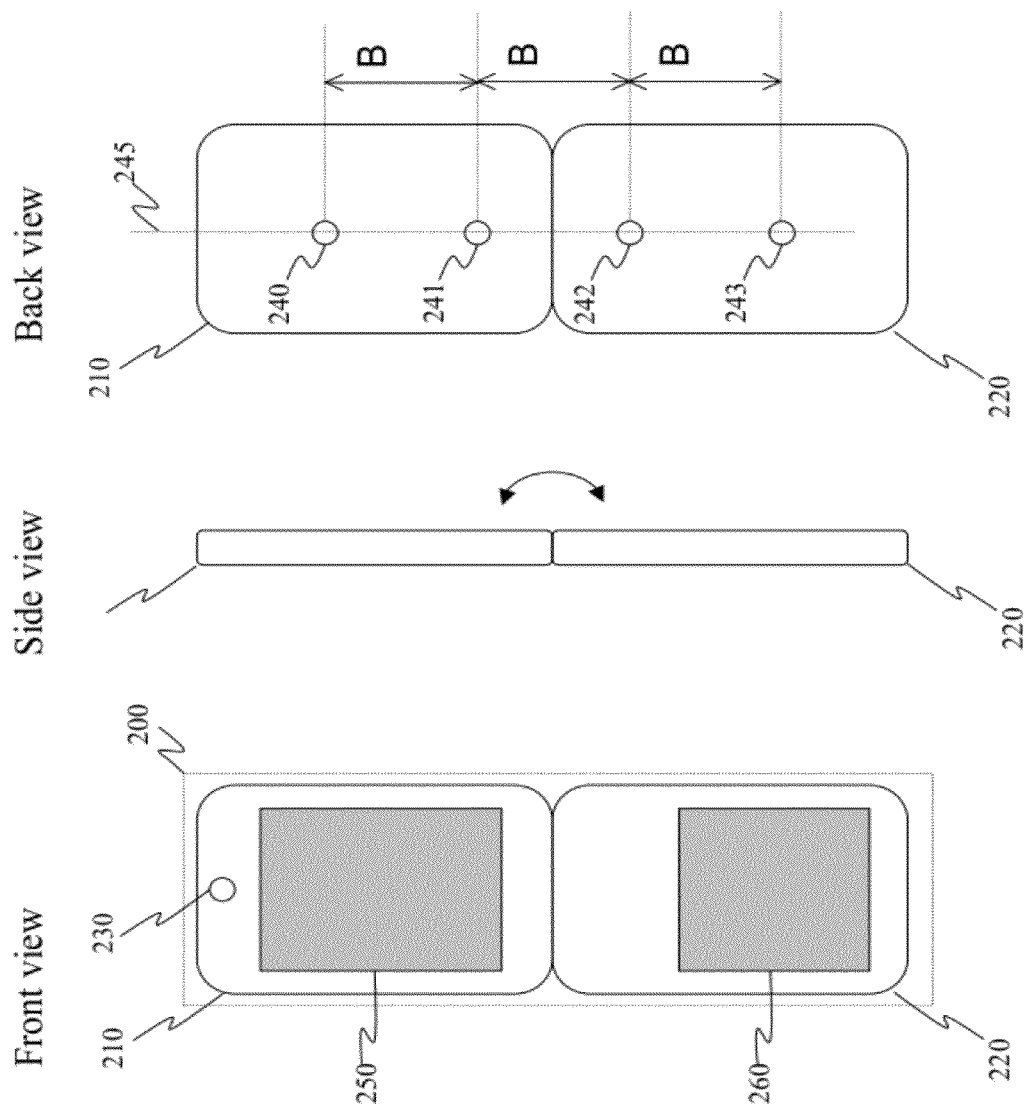
FIG. 14 is a schematic drawing of a fifth embodiment of the present invention.

FIG. 14 is a schematic drawing of the fifth embodiment of the present invention. The configuration of the fifth embodiment of the present invention is substantially the same as that of the first embodiment. The only difference lies in that: a plurality of (for example, four) image pickup elements 240, 241, 242, and 243 is installed at appropriate positions on back faces of an upper cover device 210 and a lower cover device 220. The image pickup elements 240, 241, 242, and 243 are installed at such positions that the image pickup elements 240, 241, 242, and 243 are spaced by an equal distance B and in a straight line 245 when the upper cover device 210 and the lower cover device 220 are completely unfolded. A direction of the straight line 245 must be parallel to a side (for example, a long side) of the display screen. In this way, the plurality of image pickup elements 240, 241, 242, and 243 can capture a multi-view (for example, 4-view) 3D image. Besides, two of the image pickup elements, for example, the image pickup elements 241 and 242 or the image pickup elements 240 and 243 which are respectively installed at appropriate positions on the back faces of the upper cover device 210 and the lower cover device 220 may also be used. Therefore, a convergence angle between the two image pickup elements 240 and 241 can be changed and adjusted by rotating the upper cover device 210 and the lower cover device 220 relative to each other, so as to achieve the effect of parallax changing. Further, the optimal 3D parallax adjustment required for the two image pickup elements 240 and 241 when 3D images are captured is described in detail in ROC Patent No. 1243595 and ROC Patent Application No. 098113124.

Sixth Embodiment

Figure 15:
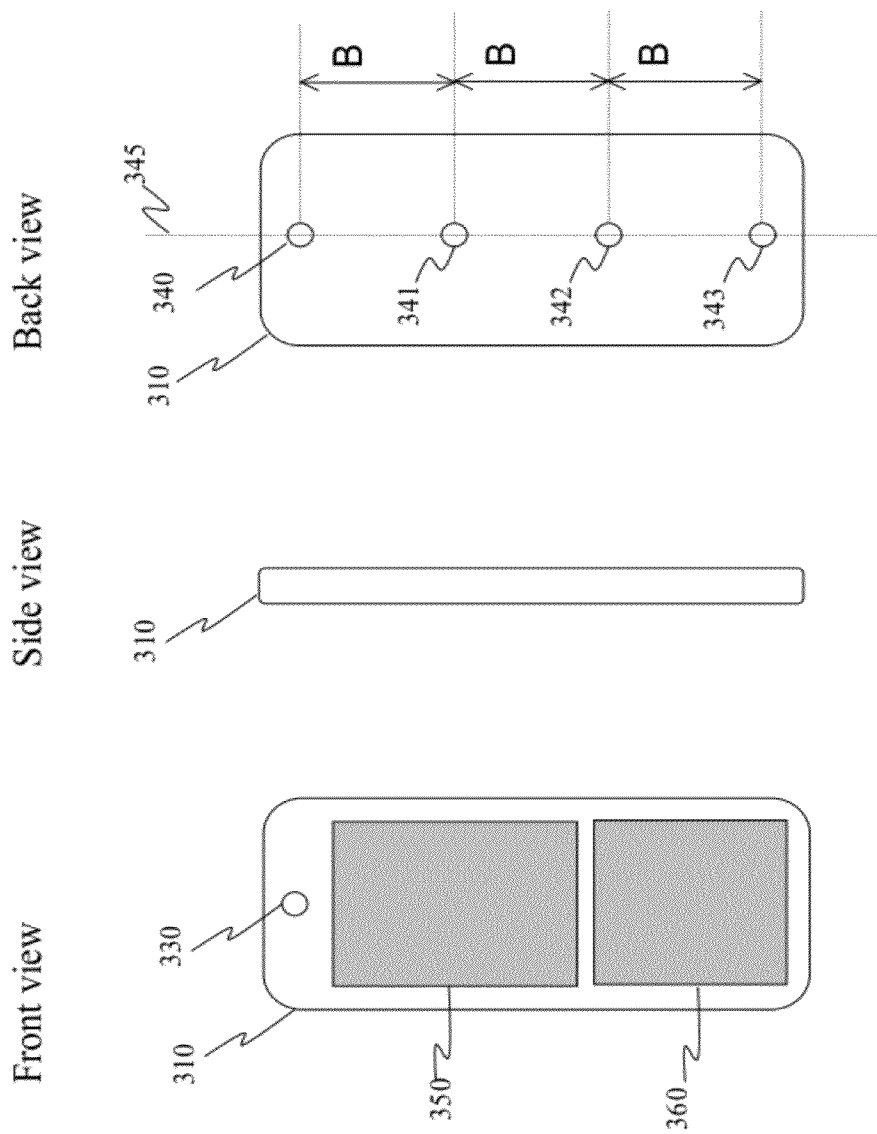
FIG. 15 is a schematic drawing of a sixth embodiment of the present invention.

FIG. 15 is a schematic drawing of the sixth embodiment of the present invention. A device 300 having 2D and 3D image display functions for a mobile phone in the sixth embodiment of the present invention is substantially the same as that in the first embodiment. The only difference lies in that: two or more (for example, four) image pickup elements 340, 341, 342, and 343 are installed at appropriate positions on a back face of the single-unit structure 310. The image pickup elements 340, 341, 342, and 343 are installed at such positions that the image pickup elements 340, 341, 342, and 343 are spaced by an equal distance B and in a straight line 345. A direction of the straight line 345 must be parallel to a side of the display screen.

To sum up, the present invention provides a device providing 2D and 3D image functions for a mobile phone, in which a plurality of image pickup elements, a 2D and 3D touch screen, and a 2D and 3D function key are installed on the mobile phone, so as to achieve the functions of 3D image capture and viewing as well as 3D interface operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device having 2D and 3D image display functions for a mobile phone, comprising:
    a mobile phone device, having a slidable upper cover mechanism and a slidable lower cover mechanism;
    a plurality of image pickup elements, installed at appropriate positions of the mobile phone device and capable of capturing 2D and 3D images;
    a 2D and 3D touch screen, installed at an appropriate position of the mobile phone device and capable of displaying the 2D and 3D images and providing a function of 3D interface operations; and
    a 2D and 3D function key, capable of starting or ending the capturing and displaying of the 3D image and the 3D interface operations, and recovering the capturing and displaying of and operations on the 2D image,
    wherein the 2D and 3D touch screen comprises a flat panel display, a 2D and 3D image switchable parallax barrier, and a touch panel; and
    wherein the 2D and 3D image switchable parallax barrier presents stripes or a transparent state according to whether a voltage is applied or not.

2. The device having 2D and 3D image display functions for a mobile phone according to claim 1, wherein the 2D and 3D image switchable parallax barrier comprises two polarizers, two indium tin oxide (ITO) glasses, and a liquid crystal layer.

3. The device having 2D and 3D image display functions for a mobile phone according to claim 2, wherein electrodes in a shape of linear stripes are printed on one of the two ITO glasses.

4. The device having 2D and 3D image display functions for a mobile phone according to claim 1, wherein the function of the 3D interface operations is to provide a stereo pattern with a 3D visual effect by the 2D and 3D touch screen, i.e., visually display a 3D graphics interface through the flat screen and the 2D and 3D image switchable parallax barrier, and to directly touch to operate the touch panel with a finger, so as to achieve an efficacy of the 3D interface operations.

5. The device having 2D and 3D image display functions for a mobile phone according to claim 1, wherein the plurality of image pickup elements is respectively installed on a same face of the upper cover mechanism and the lower cover mechanism.

6. The device having 2D and 3D image display functions for a mobile phone according to claim 1, wherein the plurality of image pickup elements is installed in a straight line, and a direction of the straight line is parallel to a side of a screen of the flat panel display.

7. A device having 2D and 3D image display functions for a mobile phone, comprising:
    a mobile phone device, having a slidable upper cover mechanism and a slidable lower cover mechanism;
    a plurality of image pickup elements, installed at appropriate positions of the mobile phone device and capable of capturing 2D and 3D images;
    a 2D and 3D touch screen, installed at an appropriate position of the mobile phone device and capable of displaying the 2D and 3D images and providing a function of 3D interface operations; and
    a 2D and 3D function key, capable of starting or ending the capturing and displaying of the 3D image and the 3D interface operations, and recovering the capturing and displaying of and operations on the 2D image,
    wherein the number of the plurality of image pickup elements used for capturing the 3D image, so as to achieve a purpose of capturing the 3D image, is two or more than two;
    wherein the two image pickup elements are installed on the same upper cover mechanism, the same lower cover mechanism, or the upper and lower cover mechanisms respectively; and
    wherein when the two image pickup elements are installed on the different upper and lower cover mechanisms respectively, a scale mark is disposed at an appropriate position on the upper and lower cover mechanisms for setting a stereo base between the two image pickup elements.

8. The device having 2D and 3D image display functions for a mobile phone according to claim 7, wherein the more than two image pickup elements are spaced by an equal distance.

9. A device having 2D and 3D image display functions for a mobile phone, comprising:
    a mobile phone device, having a rotatable upper cover mechanism and a rotatable lower cover mechanism;
    a plurality of image pickup elements, installed at appropriate positions of the mobile phone device and capable of capturing 2D and 3D images;
    a 2D and 3D touch screen, installed at an appropriate position of the mobile phone device and capable of displaying the 2D and 3D images and providing a function of 3D interface operations; and
    a 2D and 3D function key, capable of starting or ending the capturing and displaying of the 3D image and the 3D interface operations, and recovering the capturing and displaying of and operations on the 2D image,
    wherein the 2D and 3D touch screen comprises a flat panel display, a 2D and 3D image switchable parallax barrier, and a touch panel; and
    wherein the 2D and 3D image switchable parallax barrier presents stripes or a transparent state according to whether a voltage is applied or not.

10. The device having 2D and 3D image display functions for a mobile phone according to claim 9, wherein when the plurality of image pickup elements is used for capturing the 3D image, two or more of the plurality of image pickup elements are used for capturing the 3D image, so as to achieve a purpose of capturing the 3D image, the two or more image pickup elements are respectively installed on a same face of the upper cover mechanism and the lower cover mechanism but on the upper and lower cover mechanisms respectively, the two or more image pickup elements are installed in a straight line, and a direction of the straight line is parallel to a side of a screen of the flat panel display.

11. A device having 2D and 3D image display functions for a mobile phone, comprising:

a mobile phone device, having a single-unit mechanism;

a plurality of image pickup elements, installed at appropriate positions of the mobile phone device and capable of capturing 2D and 3D images;

a 2D and 3D touch screen, installed at an appropriate position of the mobile phone device and capable of displaying the 2D and 3D images and providing a function of 3D interface operations; and a 2D and 3D function key, capable of starting or ending the capturing and displaying of the 3D image and the 3D interface operations, and recovering the capturing and displaying of and operations on the 2D image, wherein the 2D and 3D touch screen comprises a flat panel display, a 2D and 3D image switchable parallax barrier, and a touch panel; and wherein the 2D and 3D image switchable parallax barrier presents stripes or a transparent state according to whether a voltage is applied or not.

12. The device having 2D and 3D image display functions for a mobile phone according to claim 11, wherein the number of the plurality of image pickup elements used for capturing the 3D image, so as to achieve a purpose of capturing the 3D image, is two or more than two.

\* \* \* \* \*